(12) United States Patent
Bokhomme et al.

(10) Patent No.: US 7,142,850 B1
(45) Date of Patent: Nov. 28, 2006

(54) RADIO ESTIMATION METHOD OF A MOBILE STATION VELOCITY

(75) Inventors: Corinne Bokhomme, Sergy (FR); Jean-Louis Dorusletter, Choiseul (FR); Nidhour Beu Rached, Paris (FR)

(73) Assignee: Nortel Matra Cellular (FR)

( * ) Notice: Subject to any disclaimer, the term of this patent is extended or adjusted under 35 U.S.C. 154(b) by 0 days.

(21) Appl. No.: 09/762,149

(22) PCT Filed: Aug. 4, 1999

(86) PCT No.: PCT/FR99/01928

§ 371 (c)(1),
(2), (4) Date: Jun. 7, 2004

(87) PCT Pub. No.: WO00/08482

PCT Pub. Date: Feb. 17, 2000

(30) Foreign Application Priority Data

Aug. 4, 1998 (FR) .................................. 98 10224

(51) Int. Cl.
*H04Q 7/20* (2006.01)
(52) U.S. Cl. ...................... 455/423; 340/936; 342/461; 702/142
(58) Field of Classification Search ................ 455/441, 455/423, 404.2; 340/936, 904; 342/461; 702/142, 96

See application file for complete search history.

(56) References Cited

U.S. PATENT DOCUMENTS

| 5,548,806 | A | * | 8/1996 | Yamaguchi et al. | ........ 455/441 |
| 6,889,041 | B1 | * | 5/2005 | Miyoshi et al. | ............ 455/423 |
| 6,907,259 | B1 | * | 6/2005 | Nilsson | ..................... 455/522 |
| 7,006,465 | B1 | * | 2/2006 | Toshimitsu et al. | ......... 370/328 |

* cited by examiner

*Primary Examiner*—Charles N. Appiah
*Assistant Examiner*—Nghi Ly
(74) *Attorney, Agent, or Firm*—Barnes & Thornburg LLP

(57) ABSTRACT

The invention relates to a method of estimating the speed (v) of a mobile station connected by a radio transmission channel to a remote station, said method including the following successive steps: receiving and filtering a transmission signal (s) to obtain a measuring signal reflecting time variations of said transmission channel, determining a correlation function ($R(\tau)$) of said measuring signal parametered by the mobile station speed (v), seeking the value ($R''(0)$) of the second derivation of said correlation function at the origin, estimating the first derivative ($\alpha_0$) of the measuring signal and calculating the variance (C) of the estimate, and identifying the results obtained during the preceding two steps ($R''(0)=C$).

8 Claims, 1 Drawing Sheet

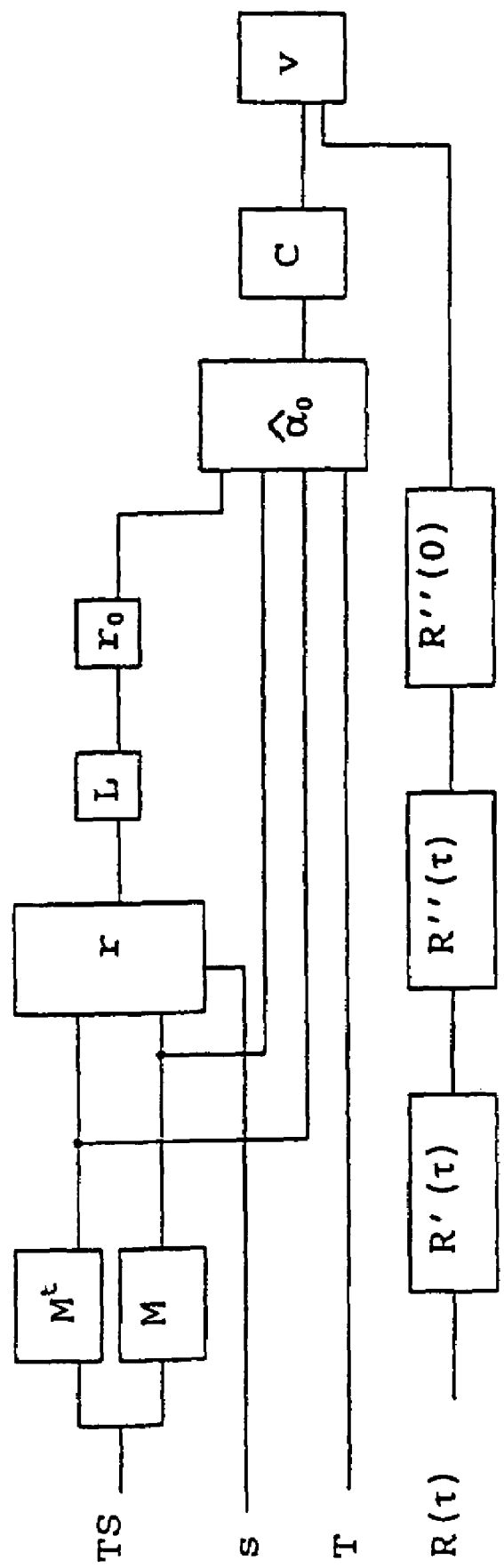
Figure unique

RADIO ESTIMATION METHOD OF A MOBILE STATION VELOCITY

The present invention relates to a method of estimating the speed of a mobile station relative to a remote station by means of a radio signal transmitted over a transmission channel linking the two stations.

The field of the invention is therefore that of mobile radio systems that set up a radio link between a portable or mobile terminal and a central equipment unit which usually services a plurality of terminals. The central equipment unit is often part of an infrastructure such as a network and is generally fixed. It is referred to herein as a remote station. In contrast, the terminal can move around while it is operating and is therefore referred to as a mobile station.

Movement of the mobile station relative to the remote station is characterized by a speed which constitutes an important item of information for more than one reason. First of all, it is an operating parameter of the mobile station and the vehicle in which it is located. Also, the more particular field of cellular mobile telephone networks is referred to.

In cellular mobile telephone networks the coverage of a mobile station is assured by a plurality of remote stations each assigned to an identified geographical sector referred to as a cell. If the mobile station is at the boundary of several cells, the question arises of to which remote station it should be connected. Clearly the speed of the mobile station is a fundamental element in choosing the appropriate remote station.

If the speed is virtually zero, it is not very probable that the mobile station will leave the cell onto which it is logged, but if the speed is high it is much more probable that the station is in the process of moving to a new cell.

Complementarily, microcellular networks in which each location is covered simultaneously by a microcell and by an umbrella cell which is superposed on a plurality of adjacent microcells is referred to. Mobile stations with a zero or low speed are preferably connected to microcells and mobile stations moving quickly should be connected to the umbrella cell to prevent too numerous and too frequent changes of microcell.

It is therefore apparent that the speed of a mobile station is a parameter that is very useful when it comes to selecting the fixed station to which to connect it, by the procedure known as "handover".

The present invention therefore provides a method of estimating the speed of a mobile station connected to a remote station by a radio transmission channel which carries a radio transmission signal.

According to the invention, said method includes the following successive steps:
receiving and filtering a transmission signal to obtain a measuring signal reflecting time variations of said transmission channel,
determining a correlation function of said measuring signal parametered by the mobile station speed,
seeking the value of the second derivation of said correlation function at the origin,
estimating the first derivative of the measuring signal and calculating the variance of the estimate, and
identifying the results obtained during the preceding two steps.

The filtering of the transmission signal advantageously consists of eliminating the additive noise of the transmission channel.

According to another feature of the invention, the measuring signal is the dynamic impulse response of the transmission channel.

In this case the method preferably includes a step of producing the static impulse response r of the transmission channel; the transmission channel has a particular time dispersion, the transmission signal is a training sequence, a measuring matrix is established from the training sequence allowing for the time dispersion, and the step of producing the static response r of the transmission channel uses the following equation:

$$s = M.r + n$$

in which n represents the additive noise of the channel.

Moreover, an additional step is provided for seeking the eigen vector $r_0$ associated with the greatest eigen value of the covariance of the static response r, the first derivative of the measuring signal is equal to a coefficient $\alpha_0$ determined so that the transmission signal is now defined by the equation:

$$s = M.r + \alpha_0 TM.r_0 + n$$

in which T is a matrix representing time.

The invention will emerge in more detail from the following description of one embodiment of the invention, which is given by way of illustrative example and with reference to the single FIGURE of the accompanying drawing, which represents in symbolic form the various steps of that embodiment.

The following notation is used, where $X(t)$ denotes a complex function of time:
$X'(t)$: first derivative of the function $X(t)$,
$X''(t)$: second derivative of the function $X(t)$,
$|X(t)|$: modulus of the function $X(t)$,
$X^*(t)$: complex conjugate function of the function $X(t)$,
$E[X(t) X^*(t)]$: variance of the function $X(t)$.

The temporal correlation function $R(\tau)$ of $X(t)$ is written as follows:

$$R(\tau) = E[X(t)X^*(t-\tau)]$$

Differentiating the above expression with respect to $\tau$, we obtain:

$$R'(\tau) = -E[X(t)X^{*'}(t-\tau)]$$

Making the change of variable $t' = t-\tau$, the preceding expression becomes:

$$R'(\tau) = E[X(t'+\tau)X^{*'}(t')]$$

Differentiating the above expression with respect to $\tau$ again, we obtain:

$$R''(\tau) = -E[X'(t'+\tau)X^{*'}(t')]$$

For the value $\tau = 0$, the above expression therefore takes the following value:

$$R''(0) = -E[X'(t)X^{*'}(t)], \text{ or}$$

$$R''(0) = -E[|X'(t)|^2] \tag{1}$$

Thus the second derivative $R''(0)$ of the correlation function at the origin has the same value as the variance of the first derivative of the function $X(t)$.

The invention proposes to use this result to estimate the speed of the mobile station.

It is assumed that the mobile station receives a transmission signal from the remote station via a transmission channel. It should nevertheless be noted that the problem is entirely symmetrical and that the solution would be the same if it were the remote station that were receiving a signal from the mobile station.

The first operation is to select a correlation model of the received signal. A correlation model with the speed of the mobile station relative to the remote station as a parameter can be determined empirically. It can equally well be a theoretical model, and in the context of this embodiment of the invention the Jakes' model is used, as it is well suited to this situation. In accordance with the Jakes' model, for a signal of normalized energy, if $J_0$ represents the zero order Bessel function, the correlation function is written:

$$R(\tau) = J_0\left(\frac{2\pi v \tau}{\lambda}\right)$$

where
v is the speed, and
$\lambda$ is the wavelength of the signal.

The first derivative of the above correlation function is written:

$$R'(\tau) = \frac{2\pi v}{\lambda} J_0'\left(\frac{2\pi v \tau}{\lambda}\right)$$

The second derivative is written:

$$R''(\tau) = \frac{4\pi^2 v^2}{\lambda^2} J_0''\left(\frac{2\pi v \tau}{\lambda}\right)$$

The value of the second derivative of the zero order Bessel function at the origin is $-\frac{1}{2}$:

$J_0''(0) = -\frac{1}{2}$

Thus:

$$R''(0) = -\frac{2\pi^2 v^2}{\lambda^2}$$

The equation (2) obtained in this way explains the dependent relationship between the second derivative of the correlation function at the origin and the speed. In the case of the Jakes' model the relationship is a particularly simple one but, regardless of which model is adopted, there is a one-to-one relationship between these two parameters.

It is then necessary to define a measurement signal $X(t)$ which reflects the temporal variations of the transmission channel.

The measurement signal can naturally be the transmission signal itself.

In this case it is preferable to apply filtering to eliminate additive noise from the transmission channel.

Note that if the transmission signal is obtained by transmitting a pulse, after the filtering referred to above the signal corresponds to the impulse response of the transmission channel.

Accordingly, in accordance with one advantageous feature of the invention, the measurement signal is the impulse response of the channel. That response is generally used for other purposes, in particular for equalizing the transmission signal, and is therefore already available.

One means of estimating the time-dependent dynamic impulse response as opposed to an estimated static impulse response ignoring temporal variations of the transmission channel is described next by way of example.

The example refers to the GSM digital cellular mobile telephone system because that system has the merit of being well-known to the skilled person. This form of presentation is adopted for clarity but must not be seen as limiting the invention in anyway to only that system.

The GSM uses training sequences TS formed of 26 symbols $a_0$ to $a_{25}$ having the value +1 or −1. The symbols coming from the transmitter are known at the receiver and the expression "training sequence" therefore refers to any sequence of bits known to the receiver by whatever means.

Referring to the FIGURE, the transmission signal is therefore the sequence s of symbols received by the receiver. The sequence s, which corresponds to the training sequence TS transmitted by the transmitter, is formed of 26 symbols $S_0$ to $S_{25}$.

Estimation techniques use a measurement matrix M constructed from the training sequence TS of length n. The matrix has (n−d) rows and (d+1) columns, where d represents the time dispersion of the channel. The item in the ith row and the jth column is the (d+i−j)th symbol of the training sequence:

$$M = \begin{bmatrix} a_4 & a_3 & a_2 & a_1 & a_0 \\ a_5 & a_4 & a_3 & a_2 & a_1 \\ a_6 & a_5 & a_4 & a_3 & a_2 \\ a_7 & \ldots & \ldots & \ldots & \ldots \\ \ldots & \ldots & \ldots & \ldots & \ldots \\ \ldots & \ldots & \ldots & \ldots & \ldots \\ a_{25} & \ldots & \ldots & \ldots & a_{21} \end{bmatrix}$$

The training sequence is chosen so that the matrix $M^t M$ can be inverted, where the operator $.^t$ represents transposition.

Conventionally, the time dispersion d of the channel, which has a value of 4 in the GSM, the estimated static impulse response takes the form of a vector with five components. Using the least squares technique, the vector r has the value $(M^t M)^{-1} M^t.s$.

A smoothing matrix L is now constructed by smoothing the various responses obtained for the training sequences successively transmitted to obtain an estimate of the covariance associated with the static response. In this context the term "smoothing" is to be understood in a very general sense, referring to any operation for smoothing or averaging the static response.

A first example of smoothing, in which the operator $.^h$ represents the Hermitian transformation, averages the matrix $rr^h$ over a period assumed to comprise m training sequences:

$$L(rr^h) = \frac{1}{m} \sum_{1}^{m} rr^h$$

In a second example of smoothing, when the ith training sequence is received the smoothing matrix obtained for the (i−1)th training sequence is updated by means of a multiplying coefficient λ, this factor being generally referred to as the smoothing forget factor and having a value from 0 to 1:

$$L_i(rr^h) = \lambda r_i r_i^h + (1-\lambda) L_{i-1}(rr^h)$$

Initialization can be effected by any means, in particular by means of the first estimate r obtained or an average obtained as above for a small number of training sequences.

The next step is to seek the eigen vector $r_0$ associated with the greatest eigen value of the matrix $L(rr^h)$.

Using the notation $u_0 = M.r_0$, it is postulated that the received signal takes the following form:

$$S = M.r + \alpha_0 T.u_0 + n \quad (3)$$

in which n is the additive noise on the transmission channel and T is a matrix which shows the time, expressed in symbol periods, at which the various symbols are received:

$$T = \begin{bmatrix} -10.5 & 0 & 0 & \cdots & \cdots & \cdots & 0 \\ 0 & -9.5 & 0 & \cdots & \cdots & \cdots & 0 \\ 0 & 0 & -8.5 & 0 & \cdots & \cdots & 0 \\ \cdots & \cdots & \cdots & \cdots & \cdots & \cdots & \cdots \\ \cdots & \cdots & \cdots & \cdots & \cdots & \cdots & \cdots \\ \cdots & \cdots & \cdots & \cdots & 0 & 9.5 & 0 \\ \cdots & \cdots & \cdots & \cdots & 0 & 0 & 10.5 \end{bmatrix}$$

T is in fact a diagonal matrix of dimension 22 in which the item in the ith row and the ith column represents the time that corresponds to the (d+i)th symbol $a_{(d+i-1)}$ of the training sequence, the time origin being arbitrarily fixed between the fifteenth and sixteenth symbols.

It is apparent that the time derivative of the dynamic impulse response takes the value of the coefficient $\alpha_0$.

A transform operator A is introduced, wherein I denotes the identity matrix:

$$A = I - M(M^t M)^{-1} M^t$$

Equation (3) then yields the following expression:

$$A.s = \alpha_0 A T.u_0 + A.n$$

Using the notation $u'_0 = T.u_0$, the solution of the above equation in the least squares sense gives the estimated value $\hat{\alpha}_0$ of the coefficient $\alpha_0$:

$$\hat{\alpha}_0 = \frac{u_0'^h A \cdot s}{u_0'^h A \cdot u_0'}$$

The next operation is to calculate the variance C of the derivative of the dynamic impulse response:

$$C = E[|\hat{\alpha}_0|^2]$$

From equations (1) and (2):

$$R''(0) = -\frac{2\pi^2 v^2}{\lambda^2}$$

$$R''(0) = -E[|X'(t)|^2]$$

From equation (3):

$$X(t) = r + i\hat{\alpha}_0 r_0$$

When $r_0$ is normalized:

$$E[|X'(t)|^2] = E[|\hat{\alpha}_0|^2]$$

It follows that:

$$C = \frac{2\pi^2 v^2}{\lambda^2}$$

The speed of the mobile station is thus obtained:

$$v = \frac{\lambda}{\pi} \sqrt{\frac{C}{2}}$$

It is therefore apparent that, knowing a model of the correlation function of a signal received via a transmission channel, it is possible to estimate the relative speed of the stations transmitting and receiving the signal.

The invention is not limited to the embodiment described. In particular, any means described can be replaced by equivalent means.

The invention claimed is:

1. A method of estimating the speed of a mobile station connected by a radio transmission channel to a remote station, said method including the following successive steps:
   receiving and filtering a transmission signal to obtain a measuring signal reflecting time variations of said transmission channel,
   determining a correlation function of said measuring signal parametered by the mobile station speed,
   seeking the value of the second derivative of said correlation function at the origin,
   estimating the first derivative of the measuring signal and calculating the variance of the estimate, and
   comparing the value of the second derivative of said correlation function at the origin with the calculated variance of said estimate and deriving from the comparison a speed estimate of the mobile station.

2. A method according to claim 1, wherein filtering said transmission signal consists of eliminating the additive noise of said transmission channel.

3. A method according to claim 1, wherein said measuring signal is the dynamic impulse response of said transmission channel.

4. A method according to claim 3, wherein, said transmission channel has a particular time dispersion, said transmission signal is a training sequence, a measuring matrix M is established from said training sequence allowing for said time dispersion, and the method includes a step of producing the static response r of said transmission channel in accordance with the equation:

$$s = M.r + n$$

in which s represents the transmission signal and n represents the additive noise of the channel.

5. A method according to claim 4, wherein, including a step of seeking the eigen vector r0 associated with the greatest eigen value of the covariance of said static response, the first derivative of said measuring signal is equal to a coefficient $\alpha_0$ determined so that said transmission signal is now defined by the equation:

$$s = M.r + \alpha_0 TM.r_0 + n$$

in which T is a matrix representing time.

6. A method according to claim 1, wherein said derived speed estimate of the mobile station is further taken into account in a handover mechanism.

7. A mobile station capable of being connected by a radio transmission channel to a remote station, said mobile station comprising:
  means for receiving and means for filtering a transmission signal received from said remote station over the transmission channel, to obtain a measuring signal reflecting time variations of said transmission channel,
  means for determining a correlation function of said measuring signal parametered by the mobile station speed,
  means for seeking the value of the second derivative of said correlation function at the origin,
  means for estimating the first derivative of the measuring signal and means for calculating the variance of the estimate, and
  mans for comparing the value of the second derivative of said correlation function at the origin with the calculated variance of said estimate and means for deriving from the comparison a speed estimate of the mobile station.

8. A station capable of being connected by a radio transmission channel to a mobile station, said station comprising:
  means for receiving and means for filtering a transmission signal received from said mobile station over the transmission channel, to obtain a measuring signal reflecting time variations of said transmission channel,
  means for determining a correlation function of said measuring signal parametered by the mobile station speed,
  means for seeking the value of the second derivative of said correlation function at the origin,
  means for estimating the first derivative of the measuring signal and means for calculating the variance of the estimate, and
  means for comparing the value of the second derivative of said correlation function at the origin with the calculated variance of said estimate and means for deriving from the comparison a speed estimate of the mobile station.

* * * * *